(No Model.)
T. H. BLAIR.
PHOTOGRAPHIC APPARATUS.
No. 261,425. Patented July 18, 1882.
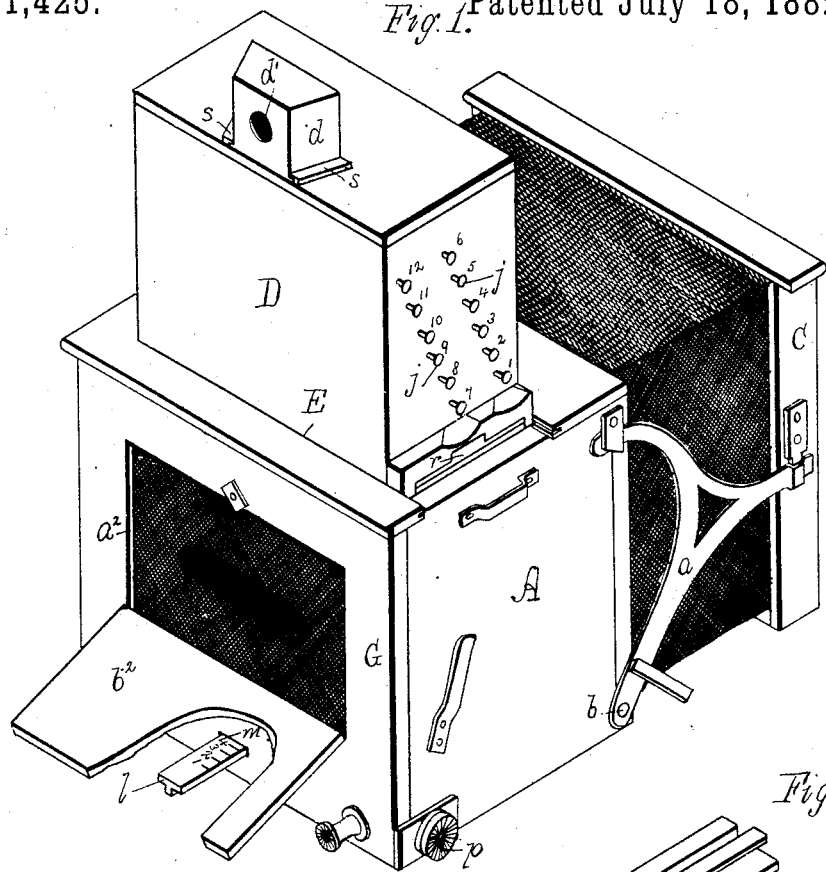
Fig. 1.
Fig. 4.
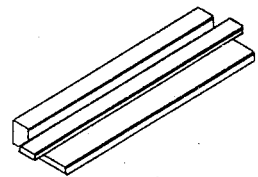
Fig. 3.
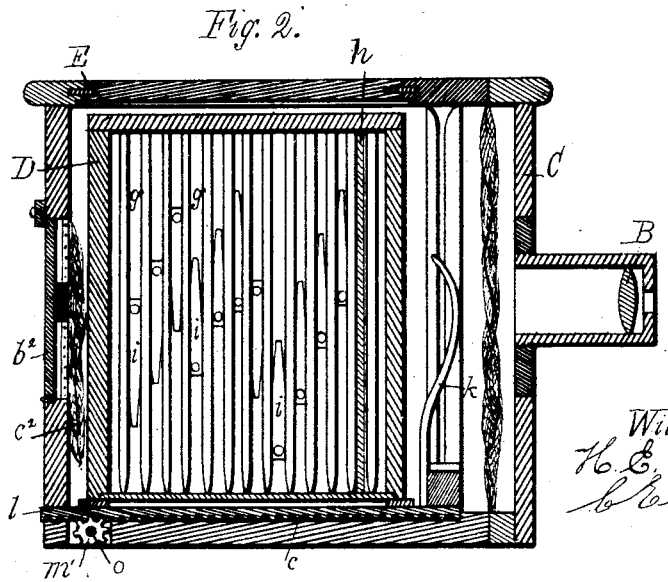
Fig. 2.
Witnesses. Inventor.
H. E. Lodge T. H. Blair.
C. E. Gordon F. Curtis Atty

UNITED STATES PATENT OFFICE.

THOMAS H. BLAIR, OF FRANKLIN, ASSIGNOR TO THE BLAIR TOUROGRAPH AND DRY PLATE COMPANY, OF BOSTON, MASSACHUSETTS.

PHOTOGRAPHIC APPARATUS.

SPECIFICATION forming part of Letters Patent No. 261,425, dated July 18, 1882.

Application filed February 24, 1880. Renewed May 20, 1882. (No model.) Patented in England February 4, 1880, No. 498; in France February 6, 1880, No. 134,937; in Belgium February 7, 1880, No. 50,511; in Germany March 28, 1880, No. 12,097, and in Canada April 3, 1880, No. 11,105.

*To all whom it may concern:*

Be it known that I, THOMAS HENRY BLAIR, of Franklin, in the county of Norfolk and State of Massachusetts, United States, have invented certain new and useful Improvements in Photographic Apparatus, of which the following is a specification.

My present invention is an improvement on the apparatus described and claimed in my Letters Patent No. 226,022, dated March 30, 1880, which I shall now proceed to describe.

The drawings accompanying this specification represent, in Figure 1, a perspective view, and in Fig. 2 a vertical section, of a camera embodying my improvement. Fig. 3 is a perspective view of the portable eye-piece or adjuster, and Fig. 4 a perspective view of closing-slide for camera-box when the plate-box is in position for exposing.

A is the case. B is the lens; C, the movable front; $a$, the supporting-bracket of said front, pivoted at $b$. $d$ is the movable adjuster, with peep-hole $d'$, front opening, $e$, and slide $f$. D is the plate-holding box, which is put into and taken out of the camera-box through the hole E. $g$ are internal guide-grooves for the plates, one of which is shown at $h$. $i$ are plate-holding springs, and $j$ are screws for regulating the pressure of the springs. F is the longitudinally-movable plate-carrier, having a plate-holding spring, $k$. $l$ is the graduated rack-bar, attached to the carrier and working through the opening $m$ in the camera-box. $m'$ is the pinion which engages the teeth $e$ of the rack-bar $l$, said pinion being mounted on the shaft $o$, provided with a milled head, $p$, by which it may be turned. The bottom of the plate-box D is provided with a sliding bottom, $r$. The apparatus thus far described is identical in structure and operation with that shown and described in my Letters Patent aforesaid, and to this extent requires no further description.

The improvement which I have made consists in combining with the case, the plate-box, and the sliding plate-carrier means for enabling the operator to elevate the negative plate into the plate-box D by hand in lieu of requiring him to invert the entire camera in order to get the plate back into its groove, as was formerly the case. To this end I create in the back G of the camera an opening, $a^2$, covered by a door, $b^2$, and I connect with this opening a glove, mitten, or other close covering for the hand, $c^2$, which extends into the interior of the camera-box a sufficient distance to enable the operator, after inserting his hand in the glove, to have access to the plate and raise the latter into the box D above.

By means of his hand, inserted in the glove $c^2$, the operator can, if desirable, lower the plate carefully to the bottom of the slide, in lieu of permitting it to drop upon the latter without restraint. The use of the glove permits of the introduction of the operator's hand to the interior of the camera-box without permitting entrance of light at the same time.

I claim—

The combination, with the camera-box, the sensitized-plate box, and the longitudinally-sliding plate-carrier of the photographic apparatus hereinbefore described, of the glove, mitten, or other close covering for the hand of the operator, arranged in an opening in the camera-box in a position to permit the transfer of the plate from the carrier to the plate-box, or the reverse, substantially as hereinbefore set forth.

THOMAS H. BLAIR.

Witnesses:
F. CURTIS,
H. E. LODGE.